United States Patent
Kamei et al.

(10) Patent No.: US 6,225,953 B1
(45) Date of Patent: May 1, 2001

(54) METHOD OF MANUFACTURING AN ANTENNA DEVICE FOR PORTABLE TELEPHONE

(75) Inventors: Yoshikazu Kamei, Odawara; Masayuki Nakamura, Yokohama; Masato Sakata, Utsunomiya, all of (JP)

(73) Assignee: The Furukawa Electric Co. Ltd., Tokyo (JP)

( * ) Notice: Subject to any disclaimer, the term of this patent is extended or adjusted under 35 U.S.C. 154(b) by 0 days.

(21) Appl. No.: 09/380,443
(22) PCT Filed: Jan. 5, 1999
(86) PCT No.: PCT/JP99/00006
  § 371 Date: Sep. 2, 1999
  § 102(e) Date: Sep. 2, 1999
(87) PCT Pub. No.: WO99/35708
  PCT Pub. Date: Jul. 15, 1999

(30) Foreign Application Priority Data

Jan. 5, 1998 (JP) .................................. 10-000055
  Nov. 20, 1998 (JP) .................................. 10-331334

(51) Int. Cl.⁷ ............................................. H01Q 1/24
(52) U.S. Cl. ............................................ 343/702; 343/895
(58) Field of Search .................................. 343/702, 895, 343/900, 901, 841, 848, 906, 850, 722

(56) References Cited

U.S. PATENT DOCUMENTS

| | | | | |
|---|---|---|---|---|
| 5,686,927 | * | 11/1997 | Simmons | 343/702 |
| 5,691,730 | * | 11/1997 | Egashira et al. | 343/702 |
| 5,812,093 | * | 9/1998 | Thompson et al. | 343/702 |
| 5,969,682 | * | 10/1999 | Ito et al. | 343/702 |
| 6,011,516 | * | 1/2000 | Minegishi et al. | 343/702 |
| 6,018,321 | * | 1/2000 | Simmons et al. | 343/702 |

FOREIGN PATENT DOCUMENTS

| | | |
|---|---|---|
| 7-24872 | 1/1995 | (JP) . |
| 7-99404 | 4/1995 | (JP) . |

* cited by examiner

*Primary Examiner*—Don Wong
*Assistant Examiner*—Chuc Tran
(74) *Attorney, Agent, or Firm*—Frishauf, Holtz, Goodman, Langer & Chick, P.C.

(57) ABSTRACT

An antenna device (A3) for a portable telephone includes a whip antenna (1) having a larger-diameter portion (52) formed near its upper end by means of forming. The guide ring (7) consisting essentially of a synthetic resin fits on the whip antenna (1), such that the guide ring (7) abuts against the larger-diameter portion (52) to rest at a position below the larger-diameter portion. The whip antenna (1) and the guide ring (7) are coated with a coating layer (19) consisting essentially of a synthetic resin. The coating layer (19) has a main portion (54) coating the whip antenna (1) below the guide ring (7), and a joint portion (56) coating the guide ring (7) and the larger-diameter portion (52). A helical antenna (25) is arranged such that it is electrically connected to a metal terminal (62) and is mechanically connected to the whip antenna (1) through the joint portion (56) and the metal terminal (62). The helical antenna (25) is coated with a block (31) consisting essentially of a synthetic resin.

6 Claims, 4 Drawing Sheets

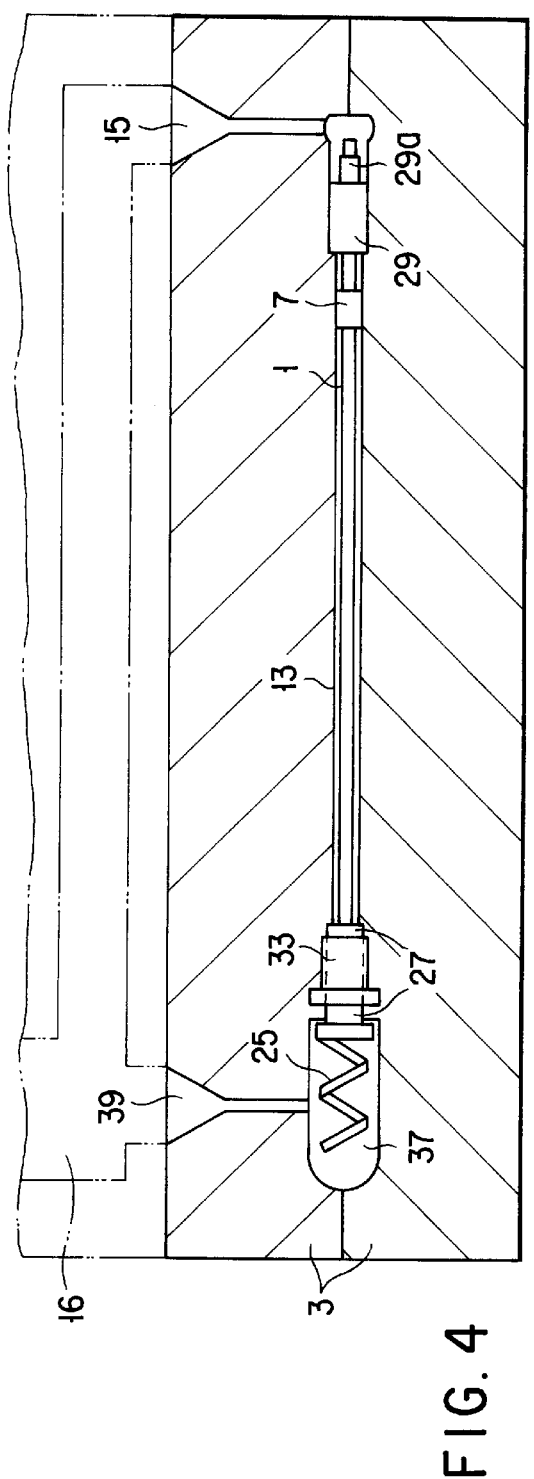

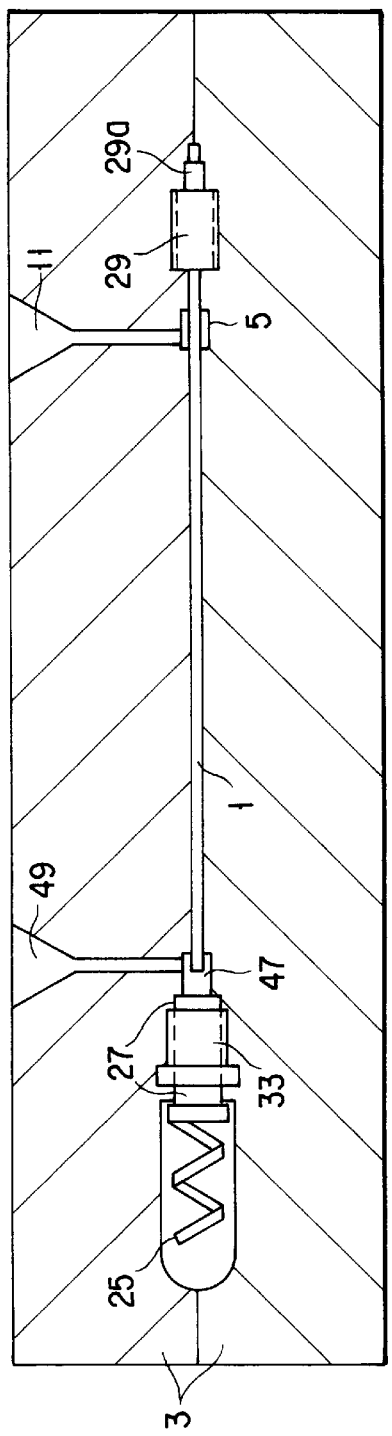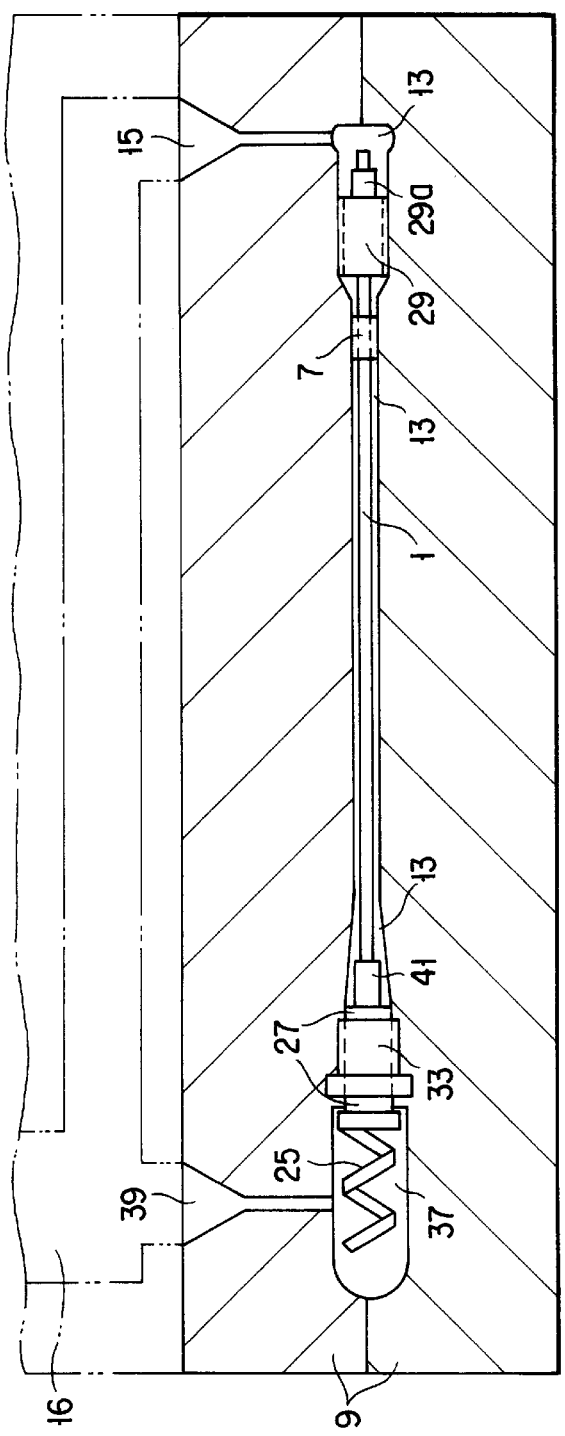
FIG. 6
FIG. 7

METHOD OF MANUFACTURING AN ANTENNA DEVICE FOR PORTABLE TELEPHONE

TECHNICAL FIELD

The present invention relates to an antenna device for a portable telephone and a method of manufacturing the antenna device, and more particularly to an improvement of an antenna device having a structure in which a helical antenna is connected to the top of a whip antenna.

BACKGROUND ART

As an antenna device for a portable telephone, such a type is known that includes a whip antenna consisting of a conductive wire like a resilient rod, and a helical antenna consisting of a conductive wire having a helical shape and connected to the top of the whip antenna. The whip and helical antennas are coated with layers each made of a synthetic resin (the term "a resin" used hereinafter means a synthetic resin) to improve their appearance and to protect their bodies. The whip antenna is provided with a first male terminal electrically connected thereto on the bottom side, and a second male terminal electrically connected to the helical antenna on the top side. There are two cases, in one of which the helical antenna is electrically connected to the whip antenna, and in the other of which the helical antenna is electrically isolated from the whip antenna. When the antenna device is pulled out of the telephone main body, the first male terminal is electrically connected to a female terminal arranged on the telephone main body. When the antenna device is pushed into the telephone main body, the second male terminal is electrically connected to the female terminal arranged on the telephone main body.

The whip antenna coated with a resin layer needs to have an exposed portion uncovered with the resin layer at one or two ends to attach a male terminal or terminals to the whip antenna. Conventionally, such a whip antenna coated with a resin layer is manufactured by either of the following two methods.

(1) A whip antenna having a predetermined length is inserted in a resin tube which has been cut in advance to have a slightly shorter length.

(2) A long metal wire for a whip antenna is coated with a resin extrusion-molded all over the wire, and then is cut into a predetermined length, from which portions of the resin coating layer at opposite ends are peeled off.

Where the manufacturing method (1) is used, there is a problem in that the resin tube and the whip antenna are less integrated, thereby allowing a positional shift between these two members. If the clearance between the resin tube and the whip antenna is made small to increase their integration, the operation of inserting the whip antenna into the resin tube becomes difficult, and thus the manufacturing becomes difficult to perform automatically.

Where the manufacturing method (2) is used, the operation of peeling off the opposite end portions of the resin coating layer is complicated, so the manufacturing cost becomes high. Further, where the whip antenna, which is generally formed of a thin metal wire, is set within a mold, and a conventional resin molding is carried out, the whip antenna is bent by the resin pressure, so the resin coating layer tends to have an uneven thickness. Especially, the whip antenna needs to have resilience as a property, and thus may be formed of a super-elastic alloy wire, which is flexible and resilient. In this case, the super-elastic alloy wire is easily bent by the resin pressure, thereby hardly forming a resin coating layer having a uniform thickness.

Further, in the conventional manufacturing methods, since male terminals are attached after the resin coating layer is arranged, there are problems in that the male terminals damage the resin coating layer when they are caulked on the resin coating layer, and the male terminals apply an excessive clamping stress to the resin coating layer, thereby causing the coating layer to be split during its service time.

DISCLOSURE OF INVENTION

An object of the present invention is to provide an antenna device for a portable telephone and a method of manufacturing the antenna device which can solve the above described problems.

According to a first aspect of the present invention, there is provided an antenna device for a portable telephone, comprising:

a whip antenna (1) having a larger-diameter portion (52) formed near its upper end by means of forming;

a first coating layer (19) consisting essentially of a synthetic resin, and having a main portion (54) coating the whip antenna (1) below the larger-diameter portion (52), and a joint portion (56) coating the larger-diameter portion (52);

a metal terminal (62) mechanically connected to the joint portion (56);

a helical antenna (25) mechanically connected to the whip antenna (1) through the joint portion (56) and the metal terminal (62), such that the helical antenna (25) is electrically connected to the metal terminal (62) and electrically isolated from the whip antenna (1); and a second coating layer (31) consisting essentially of a synthetic resin and coating the helical antenna (25).

According to a second aspect of the present invention, there is provided an antenna device for a portable telephone, comprising:

a whip antenna (1) having a larger-diameter portion (52) formed near its upper end by means of forming;

a guide ring (7) consisting essentially of a synthetic resin and fitting on the whip antenna (1), such that the guide ring (7) abuts against the larger-diameter portion (52) to rest at a position below the larger-diameter portion (52);

a first coating layer (19) consisting essentially of a synthetic resin, and having a main portion (54) coating the whip antenna (1) below the guide ring (7), and a joint portion (56) coating the guide ring (7) and the larger-diameter portion (52);

a metal terminal (62) mechanically connected to the joint portion (56);

a helical antenna (25) mechanically connected to the whip antenna (1) through the joint portion (56) and the metal terminal (62), such that the helical antenna (25) is electrically connected to the metal terminal (62); and a second coating layer (31) consisting essentially of a synthetic resin and coating the helical antenna (25).

According to a third aspect of the present invention, there is provided the device according to the second aspect, wherein the whip antenna (1) and the helical antenna (25) are electrically isolated from each other.

According to a fourth aspect of the present invention, there is provided the device according to the second aspect, wherein the whip antenna (1) and the helical antenna (25) are electrically connected to each other.

According to a fifth aspect of the present invention, there is provided the device according to the second aspect, wherein the guide ring (7) has an outer diameter substantially the same as that of the main portion (54) of the first coating layer (19).

According to a sixth aspect of the present invention, there is provided the device according to any one of the first to fifth aspects, wherein the metal terminal (62) has a recess (65) at an end facing the whip antenna (1), a projection (67) radially extending for preventing detachment is arranged in the recess (65), and the joint portion (56) has an end embedded in the recess (65).

According to a seventh aspect of the present invention, there is provided a method of manufacturing an antenna device for a portable telephone, the device comprising a whip antenna (1), a guide ring (7) consisting essentially of a synthetic resin and fitting on the whip antenna (1) near its upper end, a first coating layer (19) consisting essentially of a synthetic resin, and having a main portion coating the whip antenna (1) below the guide ring (7), a helical antenna (25) mechanically connected to the whip antenna (1) through a metal terminal (27), such that the helical antenna (25) is electrically connected to the metal terminal (27) and is positioned on an upper side of the whip antenna (1), and a second coating layer (31) consisting essentially of a synthetic resin and coating the helical antenna (25), the method comprising:

a first molding step of molding the guide ring (7) by means of insert molding, using first synthetic resin, such that the guide ring (7) fits on the whip antenna (1) near its lower end;

a placing step, after the first molding step, of placing in a mold (9) the whip antenna (1) with the guide ring (7) attached thereto, the helical antenna (25), and the metal terminal (27), in accordance with positional relationships in the device; and a second molding step, after the placing step, of pressure injecting a second synthetic resin different from the first synthetic resin into the mold (9), and coating the whip antenna (1) with the second synthetic resin to form the first coating layer (19), while moving the guide ring (7) on the whip antenna (1) toward the metal terminal (27) by the second synthetic resin.

According to an eighth aspect of the present invention, there is provided a method of manufacturing the device according to the second aspect, the method comprising:

a first molding step of molding the guide ring (7) by means of insert molding, using first synthetic resin, such that the guide ring (7) fits on the whip antenna (1) near its lower end, the whip antenna (1) having the larger-diameter portion (52) formed thereon;

a placing step, after the first molding step, of placing in a mold (9) the whip antenna (1) with the guide ring (7) attached thereto, the helical antenna (25), and the metal terminal (62), in accordance with positional relationships in the device; and a second molding step, after the placing step, of pressure injecting a second synthetic resin different from the first synthetic resin into the mold (9), and coating the whip antenna (1) and the guide ring (7) with the second synthetic resin to form the first coating layer (19), while moving the guide ring (7) on the whip antenna (1) by the second synthetic resin until the guide ring (7) hits the larger-diameter portion (52).

According to a ninth aspect of the present invention, there is provided the method according to the seventh or eighth aspect, wherein the guide ring (7) has an outer diameter substantially the same as that of the main portion (54) of the first coating layer (19).

According to a tenth aspect of the present invention, there is provided the method according to the seventh or eighth aspect, wherein the first synthetic resin has a temperature of deflection under load higher than that of the second synthetic resin by 60° C. or more, when a flexural stress of 18.0 MPa is applied.

The term "temperature of deflection under load" described above is defined in JIS K 7191-1 (ISO 75-1). Specifically, a temperature of deflection under load is a temperature at which deflection of a target resin test piece reaches a reference deflection value under the condition that the test piece is heated up at a constant rate while being supplied with a constant flexural stress, e.g., 18.0 MPa or 0.45 MPa.

In the antenna device according to either one of the first and second aspect, the whip antenna is provided with a larger-diameter portion formed near its upper end by means of forming. The engagement of the larger-diameter portion (or the larger-diameter portion and the guide ring resting thereon) with the joint portion of the resin coating layer coating the whip antenna prevents the positional shift between the whip antenna and the coating layer.

In the antenna device according to the sixth aspect, the metal terminal of the helical antenna is provided with the recess at an end, with a projection for preventing detachment arranged therein, and the joint portion has an end embedded in the recess. Consequently, the metal terminal and the joint portion are connected to each other with a high mechanical strength and a high reliability.

In the manufacturing method according to either one of the seventh and eighth aspect, the guide ring is first molded and the resin coating layer for coating the whip antenna is then molded. When the resin of the coating layer is pressure injected, the whip antenna is held by the guide ring so as not to be shifted from the center, thereby allowing the whip antenna to be coated with the resin coating layer hardly having an uneven thickness. The insert molding employed for this molding allows the resin coating layer to be satisfactorily integrated with the whip antenna.

Further, since the coating layer is not squeezed by the metal terminal, the coating layer is hardly damaged while no gap is formed between the coating layer and the metal terminal. The guide ring is left on the whip antenna and does not need to be removed. The guide ring can be covered within the metal terminal or the resin coating layer, thereby not degrading the external appearance.

In the manufacturing method according to the tenth aspect, the resin of the guide ring has a temperature of deflection under load higher than that of the resin of the coating layer for the whip antenna by 60° C. or more, when a flexural stress of 18.0 MPa is applied. Consequently, the guide ring cannot be deformed or adhered to the whip antenna by the temperature of the latter resin injected thereafter.

In the manufacturing method according to the present invention, the guide ring and the coating layer for the whip antenna are preferably molded from resins different from each other. This is because the guide ring is required not to be deformed by the temperature of the coating resin injected thereafter, but to have a satisfactory slipping property relative to the whip antenna. If the guide ring is to be formed from the resin similar to that of the coating layer, this requirement can be hardly satisfied.

The guide ring is preferably molded from a resin containing filler (glass fibers or a lubricant), or tetrafluoroethylene resin polymer functioning as a lubricant, while the coating layer for the whip antenna is preferably molded containing no filler. Where a resin containing a filler is used for the guide ring, the guide ring can have a satisfactory slipping property relative to the whip antenna, so that the resin coating for the whip antenna can be easily performed with a low pressure. A resin containing no filler is used for the whip antenna coating layer, so that the elasticity (flexibility) of the whip antenna is not damaged. This property is important in an antenna device for a portable telephone.

BRIEF DESCRIPTION OF DRAWINGS

FIG. 3 is a perspective view showing one end side of an insert component with the molded guide ring.

FIG. 4 is a partially-cross-sectional side view showing a step of molding a resin coating layer, according to the first embodiment of the present invention.

FIG. 5 is a partially-cross-sectional side view showing an antenna device for a portable telephone according to a second embodiment of the present invention.

FIG. 6 is a partially-cross-sectional side view showing a step of molding a guide ring, according to the second embodiment of the present invention.

FIG. 7 is a partially-cross-sectional side view showing a step of molding a resin coating layer, according to the second embodiment of the present invention.

BEST MODE OF CARRYING OUT THE INVENTION

First Embodiment

Figure 1:
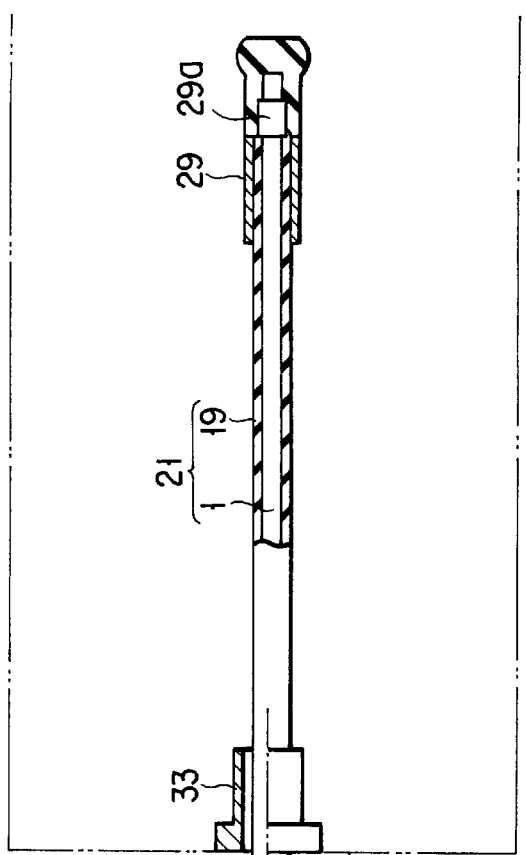
FIG. 1 is a partially-cross-sectional side view showing an antenna device for a portable telephone according to a first embodiment of the present invention.

FIG. 1 is a partially-cross-sectional side view showing an antenna device A1 for a portable telephone according to a first embodiment of the present invention. The antenna device A1 includes a whip antenna 1 consisting of a superelastic alloy wire, and a helical antenna 25 consisting of a Ni alloy wire connected to the distal end of the whip antenna by means of welding.

A first male terminal 29, which is made of a metal and has a cylindrical shape, is coaxially arranged at the proximal end of the whip antenna 1, while a second male terminal 27, which is made of a metal and has a cylindrical shape, is coaxially arranged at the distal end of the whip antenna 1. The second male terminal 27 is electrically connected to the proximal end of the helical antenna 25. The first male terminal 29 is electrically connected to the proximal end of the whip antenna 1 by its caulked portion 29a. The caulked portion 29a of the first male terminal 29 is integrally formed from a metal plate used for the first male terminal 29, as shown in FIG. 3.

The outer surface of the whip antenna 1 is coated with a resin coating layer 19 to constitute a resin-coated whip antenna section 21. The helical antenna 25 and the distal end of the second male terminal 27 are embedded in a resin layer or resin block 31. A female terminal 33 made of a metal is loosely put on the resin-coated whip antenna section 21. The first and second male terminals 29 and 27 have the same outer diameter, while the female terminal 33 has an inner diameter to fit on the first and second male terminals 29 and 27. The female terminal 33 is fixed to a telephone main body 35, and electrically connected to a circuit arranged in the telephone main body 35. A reference symbol 7 denotes a guide ring used when the whip antenna 1 is being coated with the resin coating layer 19.

When the antenna device A1 is pulled out of the telephone main body 35, the first male terminal 29 is inserted in the female terminal 33 to form an electrical connection therebetween. When the antenna device A1 is pushed into the telephone main body 35, the second male terminal 27 is inserted in the female terminal 33 to form an electrical connection therebetween.

Figure 2:
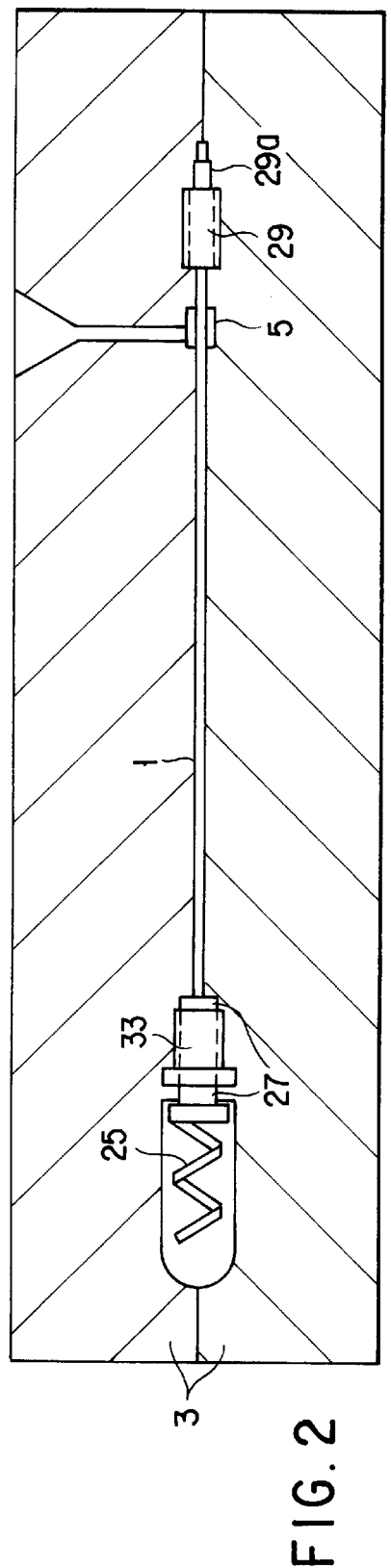
FIG. 2 is a partially-cross-sectional side view showing a step of molding a guide ring, according to the first embodiment of the present invention.

FIGS. 2 and 4 are partially-cross-sectional side views showing steps of a method of manufacturing the antenna device A1 shown in FIG. 1.

In the method according to this embodiment, at first, an insert component to be set in a mold 3 as shown in FIG. 2 is assembled. The insert component is assembled such that the first male terminal 29 is attached to the proximal end of the whip antenna 1, the helical antenna 25 and the second male terminal 27 are attached to the distal end of the whip antenna 1, and the female terminal 33 is fitted on the second male terminal 27.

Then, the inset component is set in the mold 3 for molding the guide ring, as shown in FIG. 2, and a resin is injected into a cavity 5 to mold the guide ring. With this step, the whip antenna 1 is provided with the annular guide ring 7 attached thereto near the first male terminal 29.

The outer diameter of the guide ring 7 is set to be the same as or slightly smaller than the outer diameter of the resin coating to be applied on the whip antenna 1 later. This is determined to cause the guide ring 7 to slide in the mold and to prevent a resin from leaking through the gap between the guide ring 7 and the mold, when the whip antenna 1 is coated with the resin in a later step. The resin used for the guide ring 7 differs from the resin used later for coating the whip antenna 1, such that it has a softening point higher than that of the coating resin. More specifically, the resin for the guide ring 7 has a temperature of deflection under load higher than that of the coating resin for the whip antenna 1 by 60° C. or more, and preferably by from 60° C. to 100° C., when a flexural stress of 18.0 MPa is applied.

The term "temperature of deflection under load" described above is defined in JIS K 7191-1 (ISO 75-1). Specifically, a temperature of deflection under load is a temperature at which deflection of a target resin test piece reaches a reference deflection value under the condition that the test piece is heated up at a constant rate while being supplied with a constant flexural stress, e.g., 18.0 MPa or 0.45 MPa.

Since the guide ring 7 is a member molded around the whip antenna 1, the ring 7 fits on the whip antenna 1. However, the guide ring 7 is short, and thus does not cause so much friction with the whip antenna 1, so that it can be slid in the longitudinal direction of the whip antenna 1 when it is pushed. In order to improve the slipping property of the guide ring 7 relative to the whip antenna 1, the guide ring 7 is preferably formed of a resin containing a filler, such as glass fibers, or a polymer functioning as a lubricant, such as tetrafluoroethylene resin.

Then, as shown in FIG. 4, the insert component with the guide ring 7 is set in a mold 9 used as a resin coating mold. The mold is constituted of two separable parts which are combined to form a cavity 13 for forming a resin coating around the whip antenna 1, and a cavity 37 for forming a resin block embedding the distal end of the second male terminal 27 and the helical antenna 25. The cavities 13 and 37 are supplied with resins injected therein through resin injection ports 15 and 39, respectively. The mold 9 further includes a catcher for stopping the second male terminal 27 and the female terminal 33 at a predetermined position and a catcher for stopping the first male terminal 29 at a predetermined position.

After the insert component is set in the mold 9, a molten resin is first pressure injected through the resin injection port 15. The whip antenna 1 is gradually coated with the resin coating layer 19 while the guide ring 7 is slid by the pressure of the resin. The resin stops being injected when the guide ring 7 enters the second male terminal 27 and abuts against the proximal end of the helical antenna 25 (see FIG. 1).

According to this method, the intermediate portion of the whip antenna 1 is supported by the guide ring 7 to align with the central axis of the cavity 13, and thus hardly shifts from the center. The guide ring 7 is left on the whip antenna 1, and requires no operation for removing it. The guide ring 7 is positioned in the second male terminal 27, and does not degrade the external appearance of the antenna device A1. Further, those portions of the guide ring 7 and the resin coating layer 19 which are arranged in the second male terminal 27 contribute to an increase in the mechanical connecting strength between the whip antenna 1 and the helical antenna 25, in cooperation with the second male terminal 27.

Then, a molten resin is pressure injected through the resin injection port 39 into the cavity 37 to mold the resin block 31. As shown with one-dot broken lines in FIG. 4, the two resin injection ports 15 and 39 may be connected to a common runner 16, so that the resin block 31 and the resin coating layer 19 for the whip antenna 1 are simultaneously formed from the same resin.

After the resin solidifies, the mold 9 is opened and the molded product is taken out, i.e., the antenna device A1 as shown in FIG. 1 is obtained. The antenna device A1 is manufactured such that the resin coating layer 19 is molded after the terminals 27 and 29 are attached to the whip antenna 1. Consequently, the resin coating layer 19 is not squeezed by the terminals 27 and 29, thereby reducing the possibility of the resin coating layer 19 being damaged. Further, the terminals 27 and 29 are integrated with the resin coating layer 19 without caulking, and the guide ring 7 is positioned in the second male terminal 27 and is invisible, thereby attaining a satisfactory external appearance. The resin block 31 may be covered with another resin, if necessary.

EXAMPLES

As an example 1, an antenna device as shown in FIG. 1 was manufactured, using the manufacturing method according to the first embodiment, under the following conditions. Specifically, used as the whip antenna 1 was a super-elastic alloy wire of Ni—Ti alloy storing a linear shape memory and having a diameter of 0.9 mm (with a tolerance of +0) and a length of 120 mm. Used as the mold 3 for molding the guide ring 7 was a mold including a cavity 5 having an inner diameter of 1.8 mm (with a tolerance of +0) and a length of 2 mm. Used as the mold 5 for molding the resin coating layer 19 was a mold including a cavity 13 having an inner diameter of 1.8 mm (with a tolerance of −0) and a length of 110 mm.

First, as shown in FIG. 2, the insert component was set in the mold 3 which was then heated to 150° C. Then, insert molding was performed such that a polyetherimide resin ("ULTEM" (™)) containing no filler, whose temperature of deflection under load was 200° C. when a flexural stress of 18.0 MPa was applied, was injected with a cylinder temperature resulting in a molten resin temperature of 380° C. As a result, the guide ring 7 was formed on the whip antenna 1 at a position near the first male terminal 29, as shown in FIG. 3.

Then, as shown in FIG. 4, the insert component with the guide ring 7 was set in the mold 9, which was then heated to 80° C. Then, a polymethylpentene resin ("TPX" (™)) containing no filler, whose temperature of deflection under load was 85° C. when a flexural stress of 0.45 MPa was applied, and which was selected for the NI—Ti alloy not to deteriorate its resilience, was injected with a cylinder temperature resulting in a molten resin temperature of 330° C., into the cavity 13 through the resin injection port 15. Then, a modified polyphenylene ether resin ("XYRON" (™)) containing no filler was injected with a cylinder temperature resulting in a molten resin temperature of 320° C., into the cavity 37 through the resin injection port 39.

The antenna device thus manufactured was examined, and, as a result, it was confirmed that the whip antenna 1 was coated with the resin coating layer 19 having no uneven thickness over the full length.

As an example 2, an antenna device was manufactured, under the same conditions as the example 1, except that the guide ring 7 was formed by means of insert molding, using a polyetherimide resin ("ULTEM" (™)) containing a glass-fiber filler at 10 wt %, whose temperature of deflection under load was 210° C. when a flexural stress of 18.0 MPa was applied. The guide ring 7 thus molded by the resin containing the filler had a satisfactory slipping property relative to the whip antenna 1, and thereby allowed the insert molding to be performed under injection conditions with a lower pressure and a higher speed than the example 1.

As an example 3, an antenna device was manufactured, under the same conditions as the example 1, except that the guide ring 7 was formed by means of insert molding, using a polyetherimide resin ("ULTEM" (™)) containing polytetrafluoroethylene resin and a glass-fiber filler at 20 wt %, whose temperature of deflection under load was 210° C. when a flexural stress of 18.0 MPa was applied. The guide ring 7 thus molded had a more satisfactory slipping property relative to the whip antenna 1, and thereby allowed the insert molding to be performed under injection conditions with a lower pressure and a higher speed than the example 2.

COMPARATIVE EXAMPLES

As a comparative example 1, an antenna device was manufactured, under the same conditions as the example 1, except that the guide ring 7 was not attached to the whip antenna 1. The antenna device thus manufactured ended up having an uneven resin layer, therefore exposing part of the central portion of the whip antenna.

As a comparative example 2, an antenna device was manufactured, under the same conditions as the example 1, except that the guide ring 7 was formed by an injection molding, using a polymethylpentene resin ("TPX" (™)) with a cylinder temperature resulting in a molten resin temperature of 330° C. As a result, the guide ring 7 was not slid to prevent the whip antenna from being coated with the resin.

As a comparative example 3, a guide ring two to four times longer than the guide ring of example 1 was used as the guide ring. As a result, the whip antenna was prevented from being coated with the resin.

It has been confirmed from the trial manufacture that the manufacturing method according to the present invention is effective in preventing unevenness of the coating layer.

Second Embodiment

FIG. 5 is a partially-cross-sectional side view showing an antenna device A2 for a portable telephone according to a second embodiment of the present invention. The antenna device A2 includes a whip antenna 1 consisting of a super-elastic alloy wire, and a helical antenna 25 consisting of a Ni alloy wire mechanically connected to the distal end of the whip antenna 1. The whip antenna 1 and the helical antenna 25 are electrically isolated from each other.

A first male terminal 29, which is made of a metal and has a cylindrical shape, is coaxially arranged at the proximal end of the whip antenna 1, while a second male terminal 27, which is made of a metal and has a cylindrical shape, is integratedly attached by a resin connector 41 (insulating body) to the distal end of the whip antenna 1 to be coaxial therewith. The second male terminal 27 is electrically connected by means of welding to the proximal end of the helical antenna 25. The first male terminal 29 is electrically connected to the proximal end of the whip antenna 1 by its caulked portion 29a. The caulked portion 29a of the first male terminal 29 is integrally formed from a metal plate used for the first male terminal 29, as shown in FIG. 3.

The outer surface of the whip antenna 1 is coated with a resin coating layer 19 to constitute a resin-coated whip antenna section 21. The helical antenna 25 and the distal end of the second male terminal 27 are embedded in a resin block 31. A female terminal 33 made of a metal is loosely put on the resin-coated whip antenna section 21. The first and second male terminals 29 and 27 have the same outer diameter, while the female terminal 33 has an inner diameter to fit on the first and second male terminals 29 and 27. A reference symbol 7 denotes a guide ring used when the whip antenna 1 is being coated with the resin coating layer 19.

FIGS. 6 and 7 are partially-cross-sectional side views showing steps of a method of manufacturing the antenna device A2 shown in FIG. 5.

In the method according to this embodiment, at first, an insert component to be set in a mold 3 as shown in FIG. 6 is assembled. The insert component consists of two parts, one of which is formed such that the first male terminal 29 is attached to the proximal end of the whip antenna 1, and the other of which is formed such that the helical antenna 25 is attached to the distal end of the second male terminal 27, and the female terminal 33 is fitted on the second male terminal 27. The whip antenna 1 is formed of, e.g., a super-elastic alloy wire having an outer diameter of 0.8 mm.

Then, the inset component is set in the mold 3 for molding the guide ring, as shown in FIG. 6. The mold 3 has a cavity 5 for molding the guide ring 7 and the cavity 47 for molding the resin connector 41 which connects the second male terminal 27 and the whip antenna 1. The cavities 5 and 47 are supplied with resins injected therein through resin injection ports 11 and 49, respectively. The mold 3 further includes a catcher for stopping the first male terminal 29 at a predetermined position and a catcher for stopping the second male terminal 27 and the female terminal 33 at a predetermined position. The mold 3 is heated at 80° C. in advance.

After the insert component is set in the mold 3, a modified polyphenylene ether resin ("XYRON" (™)) containing no filler, whose temperature of deflection under load is 170° C. when a flexural stress of 18.0 MPa is applied, is injected with a cylinder temperature resulting in a molten resin temperature of 320° C., into the cavity 5 through the resin injection port 11. Then, a polyhexamethylene adipamide resin ("LEONA" (™)) containing no filler, whose temperature of deflection under load is 70° C. when a flexural stress of 18.0 MPa is applied, is injected with a cylinder temperature resulting in a molten resin temperature of 290° C., into the cavity 47 through the resin injection port 49.

After the resin solidifies, the mold 3 is opened and the molded product is taken out, i.e., an insert component for the next step is obtained. In this insert component, the guide ring 7 is attached to the whip antenna 1 near the first male terminal 29, and the distal end of the whip antenna 1 and the second male terminal 27 are connected to each other by the resin connector 41. The size and material of the guide ring 7 are the same as those in the first embodiment.

Then, the inset component is set in the mold 9 for molding the resin coating, as shown in FIG. 7. The mold 9 has a cavity 13 for molding the resin coating layer 19 on the whip antenna 1 and the cavity 37 for molding the resin block 31 which embeds the distal end of the second male terminal 27 and the helical antenna 25. The cavities 13 and 37 are supplied with resins injected therein through resin injection ports 15 and 39, respectively. The mold 9 further includes a catcher for stopping the first male terminal 29 at a predetermined position and a catcher for stopping the second male terminal 27 and the female terminal 33 at a predetermined position. The inside of the cavity 13 is tapered, such that its inner diameter is smaller at an intermediate position than the outer diameters of the second and first male terminals 27 and 29, but is the same as those at a position near the second and first male terminals 27 and 29. The mold 9 is heated at 80° C. in advance.

After the insert component is set in the mold 9, an ester based thermoplastic elastomer ("PELPRENE" (™)) containing no filler, whose temperature of deflection under load is 140° C. when a flexural stress of 0.45 MPa is applied, is injected with a cylinder temperature resulting in a molten resin temperature of 260° C., through the resin injection port 15. The whip antenna 1 is gradually coated with the resin coating layer 19 while the guide ring 7 is slid by the pressure of the resin. This manner is the same as that of the first embodiment, thus the resin coating layer 19 hardly has an uneven thickness. The resin stops being injected when the guide ring 7 hits the resin connector 41. When the guide ring 7 comes to the position where it abuts against the resin connector 41, it is positioned in the tapered larger-diameter portion of the cavity 13, where the resin fills around the guide ring 7, so that it is embedded in the resin (see FIG. 5).

Then, a modified polyphenylene ether resin ("XYRON" (™)) containing no filler is injected with a cylinder temperature resulting in a molten resin temperature of 320° C., into the cavity 37 through the resin injection port 39, so that the resin block 31 is molded. As shown with one-dot broken lines in FIG. 7, the two resin injection ports 15 and 39 may be connected to a common runner 16, so that the resin block 31 and the resin coating layer 19 for the whip antenna 1 are simultaneously formed from the same resin.

After the resin solidifies, the mold 9 is opened and the molded product is taken out, i.e., the antenna device A2 as shown in FIG. 5 is obtained. The antenna device A5 is manufactured such that the resin coating layer 19 is molded after the terminals 27 and 29 are attached to the whip antenna 1. Consequently, the resin coating layer 19 is not squeezed by the terminals 27 and 29, thereby reducing the possibility of the resin coating layer 19 being damaged. Further, the terminals 27 and 29 are integrated with the resin coating layer 19 without caulking, and the guide ring 7 is embedded in the resin coating layer 19, thereby attaining a satisfactory external appearance. The resin block 31 may be covered with another resin, if necessary.

Third Embodiment

Figure 8:
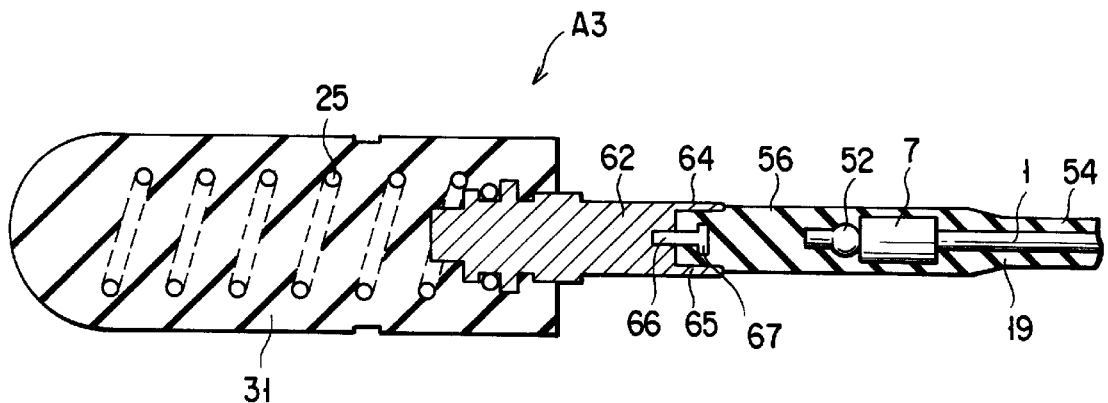
FIG. 8 is a partially-cross-sectional side view showing an antenna device for a portable telephone according to a third embodiment of the present invention.

FIG. 8 is a partially-cross-sectional side view showing an antenna device A3 for a portable telephone according to a third embodiment of the present invention. The antenna device A3 includes a whip antenna 1 consisting of a superelastic alloy wire, and a helical antenna 25 consisting of a Ni alloy wire mechanically connected to the distal end of the whip antenna 1. The whip antenna 1 and the helical antenna 25 are electrically isolated from each other. The structure of the whip antenna 1 on the proximal end, which is not shown in FIG. 8, is the same as those of first and second embodiments, and thus an explanation thereof will be omitted.

The whip antenna 1 is provided with a larger-diameter portion 52 near the distal or upper end, which has been formed by means of forming, such as stamping or the like. A guide ring 7 made of a resin fits on the whip antenna 1, and abuts against the larger-diameter portion 52 to rest at a position below the larger-diameter portion 52, i.e., on the opposite side to the helical antenna 25.

The whip antenna 1 is coated with a resin coating layer 19, while the helical antenna 25 is coated with a resin block 31. The coating layer 19 for the whip antenna 1 includes a main portion 54 coating the whip antenna 1 below the guide ring 7, and a joint portion 56 coating the guide ring 7 and the larger-diameter portion 52. The main portion 54 and the guide ring 7 are set to have substantially the same diameter. The engagement of the guide ring 7 and the larger-diameter portion 52 with the joint portion 56 prevents the positional shift between the whip antenna 1 and the coating layer 19.

The joint portion 56 of the coating layer 19 is mechanically connected, in a manner described later, to a second male terminal 62 made of a metal, which is electrically connected to the helical antenna 25. The whip antenna 1 and the helical antenna 25 are mechanically connected to each other through the joint portion 56 and the second male terminal 62. However, the whip antenna 1 and the helical antenna 25 are electrically isolated from each other by the joint portion 56.

The second male terminal 62 consists of a solid round rod with a hollow cylindrical portion 64 formed at the lower end to define a recess 65. The recess 65 is provided with a rivet 66 fixed on the ceiling, and the rivet 66 has a projection 67 radially and outwardly extending from the distal end. The corresponding end of the joint portion 56 is embedded in the recess 65 and surrounds the projection 67, so that the projection 67 prevents the joint portion 56 from being detached. The joint portion 56 has a diameter slightly smaller than the second male terminal 62. Consequently, the second male terminal 62 can be smoothly inserted into a female terminal 33.

Since the second male terminal 62 consists of a solid round rod, it has a strength higher than a hollow rod. Due to this, the second male terminal 62 is prevented from being bent or broken near the attachment of the helical antenna 25, when an impact load is applied to the head of the antenna device A3 (i.e., a portion containing the helical antenna 25) in a state where the whip antenna 1 is retreated (i.e., the second male terminal 62 is inserted in the female terminal 33).

At the connection between the second male terminal 62 and the joint portion 56, the projection 67 for preventing detachment is embedded in the resin of the joint portion 56 within the cylindrical portion 64. Consequently, this connection is very strong, so that the connection between the second male terminal 62 and the joint portion 56 is prevented from being bent or broken when a lateral load is applied to the head of the antenna device A3 in a state where the whip antenna 1 is pulled out. Further, the projection 67 for preventing detachment is surrounded by the hollow cylindrical portion 64, and the resin around the projection 67 is held by the metal cylindrical portion 64, which has a high rigidity, so that the resin around the projection 67 is prevented from being deformed or broken.

The antenna device A3 for a portable telephone according to the third embodiment of the present invention may be manufactured by a method the same as either one of the manufacturing methods for the antenna devices A1 and A2 according to the first and second embodiments. However, this embodiment differs from the first and second embodiments in that the guide ring 7 is positioned by the larger-diameter portion 52 formed on the whip antenna 1 by means of forming, in the second molding step of molding the coating layer 19 for the whip antenna 1.

More specifically, as shown in FIG. 2, an insert component including the whip antenna 1 with the larger-diameter portion 52 formed thereon is placed in a predetermined mold. Then, a resin is pressure injected in the mold, so that the guide ring 7 is molded and fits on a portion near the lower end of the whip antenna 1.

Then, as shown in FIG. 4, an insert component, including the whip antenna 1 with the guide ring 7 attached thereon, the helical antenna 25, and the metal terminal 62, is placed in an another mold, in accordance with the positional relationships in the device. Then a resin is pressure injected in the mold, so that the guide ring 7 is moved by the pressure of the resin on the whip antenna 1 from its lower end to a position where the guide ring 7 hits the larger-diameter potion 52. In this step, the whip antenna 1 and the guide ring 7 are coated with the resin, and the recess 65 of the metal terminal 62 is filled with the resin. As a result, the antenna device A3 as shown in FIG. 8 is obtained.

Fourth Embodiment

Figure 9:
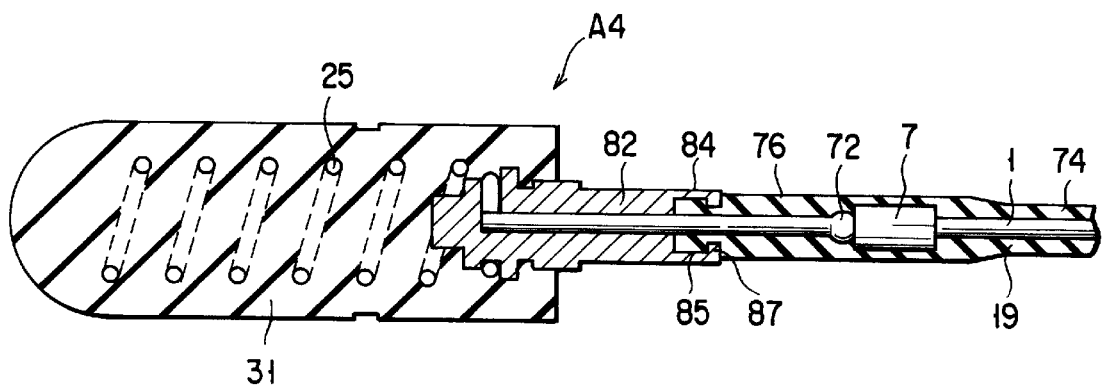
FIG. 9 is a partially-cross-sectional side view showing an antenna device for a portable telephone according to a fourth embodiment of the present invention.

FIG. 9 is a partially-cross-sectional side view showing an antenna device A4 for a portable telephone according to a fourth embodiment of the present invention. The antenna device A4 includes a whip antenna 1 consisting of a superelastic alloy wire, and a helical antenna 25 consisting of a Ni alloy wire connected to the distal end of the whip antenna by means of welding. The structure of the whip antenna 1 on the proximal end, which is not shown in FIG. 9, is the same as those of the first and second embodiments, and thus an explanation thereof will be omitted.

The whip antenna 1 is provided with a larger-diameter portion 72 near the upper end, which has been formed by means of forming, such as stamping or the like. A guide ring 7 made of a resin fits on the whip antenna 1, and abuts against the larger-diameter portion 72 to rest at a position below the larger-diameter portion 72, i.e., on the opposite side to the helical antenna 25.

The whip antenna 1 is coated with a resin coating layer 19, while the helical antenna 25 is coated with a resin block 31.

The coating layer 19 for the whip antenna 1 includes a main portion 74 coating the whip antenna 1 below the guide ring 7, and a joint portion 76 coating the guide ring 7 and the larger-diameter portion 72. The main portion 74 and the guide ring 7 are set to have substantially the same diameter. The engagement of the guide ring 7 and the larger-diameter portion 72 with the joint portion 76 prevents the positional shift between the whip antenna 1 and the coating layer 19.

The upper end of the whip antenna 1 penetrates the joint portion 76 and is inserted in an axial hole formed in a second male terminal 82 which is made of metal and electrically connected to the helical antenna 25. The distal end of the whip antenna 1 is connected to the helical antenna 25 by means of welding, so that the whip antenna 1 and the helical antenna 25 are electrically connected to each other. The joint portion 76 of the coating layer 19 is mechanically connected, in a manner described later, to the second male terminal 82. The whip antenna 1 and the helical antenna 25 are mechanically connected to each other through the joint portion 76 and the second male terminal 82, as well as the welding connection.

The second male terminal 82 consists of a solid round rod with a hollow cylindrical portion 84 formed at the lower end to define a recess 85. The cylindrical portion 84 is provided with a projection 87 radially and inwardly extending from the distal end. The corresponding end of the joint portion 76 is embedded in the recess 85 and surrounds the projection 87, so that the projection 87 prevents the joint portion 76 from being detached.

The antenna device A4 for a portable telephone according to the fourth embodiment of the present invention may be manufactured by a method the same as that of the antenna device A3 according to the third embodiment. Accordingly, an explanation of the method will be omitted.

The present invention has been described by way of its preferred embodiments shown in the accompanying drawings, though the present invention is not limited to the specific details of the embodiments. Additional advantages and modifications will readily occur to those skilled in the art, without departing from the spirit or scope of the general inventive concept as defined by the appended claims, and thus they should be interpreted to fall in the spirit or scope of the present invention.

What is claimed is:

1. A method of manufacturing an antenna device for a portable telephone, the antenna device comprising:
   a whip antenna,
   a guide ring consisting essentially of a synthetic resin and fitting on the whip antenna near its upper end,
   a first coating layer consisting essentially of a synthetic resin, and having a main portion coating the whip antenna below the guide ring,
   a helical antenna mechanically connected to the whip antenna through a metal terminal, such that the helical antenna is electrically connected to the metal terminal and is positioned on an upper side of the whip antenna, and
   a second coating layer consisting essentially of a synthetic resin and coating the helical antenna,
   the method comprising:
      a first molding step of molding the guide ring by means of insert molding, using a first synthetic resin, such that the guide ring fits on the whip antenna near its lower end;
      a placing step, after the first molding step, of placing in a mold the whip antenna with the guide ring attached thereto, the helical antenna, and the metal terminal, in accordance with positional relationships in the antenna device; and
      a second molding step, after the placing step, of pressure injecting a second synthetic resin different from the first synthetic resin into the mold, and coating the whip antenna with the second synthetic resin to form the first coating layer, while moving the guide ring on the whip antenna toward the metal terminal by the second synthetic resin.

2. The method according to claim 1, wherein the guide ring has an outer diameter substantially the same as that of the main portion of the first coating layer.

3. The method according to claim 1, wherein the first synthetic resin has a temperature of deflection under load higher than that of the second synthetic resin by 60° C. or more, when a flexural stress of 18.0 MPa is applied.

4. A method of manufacturing an antenna device for a portable telephone, the antenna device comprising:
   a whip antenna having a larger-diameter portion formed near its upper end by means of forming,
   a guide ring consisting essentially of a synthetic resin and fitting on the whip antenna, such that the guide ring abuts against the larger-diameter portion to rest at a position below the larger-diameter portion,
   a first coating layer consisting essentially of a synthetic resin, and having a main portion coating the whip antenna below the guide ring, and a joint portion coating the guide ring and the larger-diameter portion,
   a metal terminal mechanically connected to the joint portion,
   a helical antenna mechanically connected to the whip antenna through the joint portion and the metal terminal, such that the helical antenna is electrically connected to the metal terminal, and
   a second coating layer consisting essentially of a synthetic resin and coating the helical antenna,
   the method comprising:
      a first molding step of molding the guide ring by means of insert molding, using a first synthetic resin, such that the guide ring fits on the whip antenna near its lower end, the whip antenna having the larger diameter portion formed thereon;
      a placing step, after the first molding step, of placing in a mold the whip antenna with the guide ring attached thereto, the helical antenna, and the metal terminal, in accordance with positional relationships in the antenna device; and
      a second molding step, after the placing step, of pressure injecting a second synthetic resin different from the first synthetic resin into the mold, and coating the whip antenna and the guide ring with the second synthetic resin to form the first coating layer, while moving the guide ring on the whip antenna by the second synthetic resin until the guide ring hits the larger-diameter portion.

5. The method according to claim 4, wherein the guide ring has an outer diameter substantially the same as that of the main portion of the first coating layer.

6. The method according to claim 4, wherein the first synthetic resin has a temperature of deflection under load higher than that of the second synthetic resin by 60° C. or more, when a flexural stress of 18.0 MPa is applied.

* * * * *